United States Patent [19]

Hoffman et al.

[11] Patent Number: 4,725,173

[45] Date of Patent: Feb. 16, 1988

[54] TOOL COUPLING DEVICE

[75] Inventors: Karl C. Hoffman, Sandviken, Sweden; Ulrich Körner, Heimsheim, Fed. Rep. of Germany

[73] Assignee: Santrade Limited, Lucerne, Switzerland

[21] Appl. No.: 860,482

[22] Filed: May 7, 1986

[30] Foreign Application Priority Data

May 8, 1985 [SE] Sweden ................................ 8502263

[51] Int. Cl.⁴ ......................... B23B 29/00; B23C 5/26

[52] U.S. Cl. .................................... 409/234; 82/36 B; 279/67; 408/240

[58] Field of Search .................... 279/1 A, 67, 68, 112, 279/1 R, 117, 8; 408/239 R, 239 A, 240; 409/230, 231, 232, 233, 234; 82/36 B

[56] References Cited

U.S. PATENT DOCUMENTS

| | | | |
|---|---|---|---|
| 755,246 | 3/1904 | Rockwell et al. | 279/68 |
| 2,485,799 | 10/1949 | Woytych | 279/67 |
| 4,274,314 | 6/1981 | Repinski | 408/239 R |
| 4,575,293 | 3/1986 | Berti | 409/234 |
| 4,611,383 | 9/1986 | Sonnek | 29/568 |
| 4,615,244 | 10/1986 | Reiter et al. | 82/36 B |

FOREIGN PATENT DOCUMENTS

| | | | |
|---|---|---|---|
| 87972 | 9/1983 | European Pat. Off. | 408/239 A |
| 3127486 | 1/1983 | Fed. Rep. of Germany | 279/8 |

*Primary Examiner*—Z. R. Bilinsky

*Attorney, Agent, or Firm*—Burns, Doane, Swecker & Mathis

[57] ABSTRACT

The present invention relates to a tool coupling device comprising a coupling element (10) attachable to a machine tool and a tool adapter (11) intended to clamp a tool for chip forming machining. A plug (18) on the adapter (11) is related to a contact surface (30;38) that is intended to be in engagement with a corresponding contact surface (29;37) related to the coupling element (10), said engagement clamping the adapter (11) against the coupling element (10).

5 Claims, 4 Drawing Figures

TOOL COUPLING DEVICE

BACKGROUND OF THE INVENTION

The present invention relates to a tool coupling device comprising a coupling element that can be attached directly or indirectly to a machine tool and a tool adapter intended to clamp a tool for metal cutting, said coupling element being provided with an axial boring that has at least one internal guiding surface, a plug provided on the adapter and designed to be guided into said boring, said plug being related to a contact surfaec running in transverse direction to the tool adapter and designed for engagement with a corresponding contact surface related to the coupling element for clamping the adapter against the coupling element, and that one of the contact surfaces is provided on clamping means being displaceable in a transverse direction to the adapter.

A tool coupling device for the above type is described in SE-B-427 732. In this known tool coupling device the clamping means has a tendency to upset when clamping the tool adapter. Besides, the clamping means is relatively spacious which means that the tool coupling cannot be used at small dimensions of the coupling element.

An aim of the present invention is to provide a tool coupling device comprising clamping means with an essentially reduced tendency to upset.

THE DRAWINGS

The invention is described more in detail with reference to the enclosed drawings exemplifying two different embodiments. It is to be understood that these embodiments only are intended to illustrate the invention and that the invention can be varied within the scope of the appending claims.

On the drawings, FIG. 1 discloses a longitudinal section through an embodiment of a tool coupling device according to the invention.

FIG. 2 discloses a section along the line II—II in FIG. 1.

FIG. 3 discloses a longitudinal section through another embodiment of the tool coupling device according to the invention.

FIG. 4 discloses a section along the line IV—IV in FIG. 3.

DESCRIPTION OF A PREFERRED EMBODIMENT OF THE INVENTION

Figure 1:
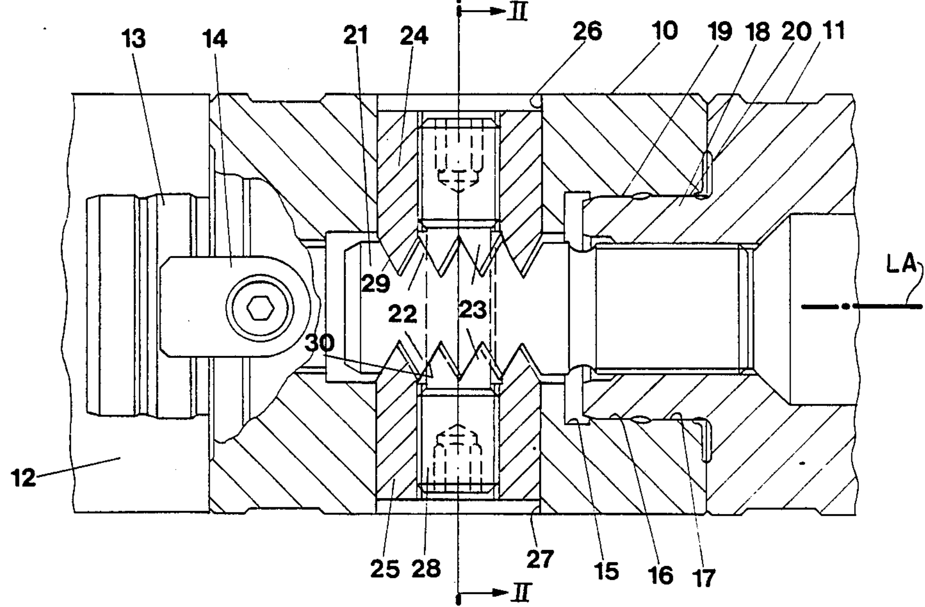
Figure 2:
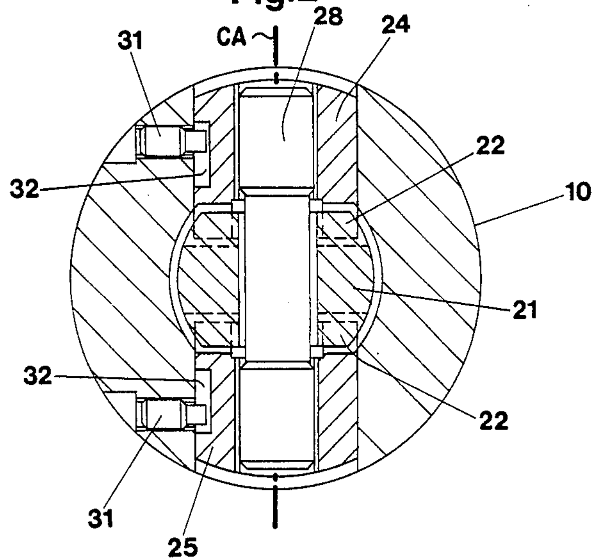

The embodiment disclosed in FIGS. 1 and 2 comprises a coupling element 10 and a tool adapter 11. The coupling element 10 is designed for connection with a base holder 12 of the type disclosed in SE-B-423 875. The coupling element 10 is thus provided with a centering plug 13 that is designed to be guided into a boring of the base holder 12. The coupling element 10 is locked against rotation by a wedge 14 that is attached to the coupling element 10. Said coupling element 10 is connected to the base holder 12 by a clamping bolt arranged in the base holder 12, said connection being carried out in a manner described in SE-B-423 875.

The coupling element 10 is, at the end opposite the base holder 12, provided with an axial boring 15, that has cylindrical guide surfaces 16, 17. The front surface 17, i e the surface located closest to the tool, has a somewhat larger diameter than the rear guide surface 16. The adapter 11 is provided with a plug 18 that is provided with guide surfaces 19, 20 corresponding to the guide surfaces 16, 17 in order to achieve slip fit between the plug 18 and the boring 15. The adapter 11 is provided with a wedge corresponding to the wedge 14 in order to lock the adapter against rotation relative to the coupling element 10.

In the plug 18 a bolt or tongue 21 is screwed. The portion of the bolt 21 projecting from the plug 18 is planed at two diametrically opposite sides, the planar surfaces being generally saw-toothed. The teeth 22 on these saw-toothed surfaces are arranged to receive between themselves teeth 23 that are arranged on the opposite faces on two nuts 24, 25. The nuts 24, 25 are slidingly guided in cylindrical borings 26, 27 in the coupling element 10 for movement along center axes CA. The nuts 24, 25 are in respect of force transmission connected by a clamping bolt 28, one end of which has a left-hand thread and the other end has a right-hand thread. When rotating the bolt 28 the the nuts or clamping means 24, 25 move either towards each other or from each other. The teeth 22, 23 are mutually designed in such a way that contact is established only on the flanks 29 of the nuts 24, 25 that face rearwardly towards the tool machine and the flanks 30 on the bolt 21 that face forwardly toward the adapter 11.

The flanks 30 are consequently constituting contact surfaces related tot he plug 18 and running in the transverse direction of the adapter 11. These contact surfaces are intended to co-operate with the flanks 29, that constitute contact surfaces related to the coupling element 10 when clamping the adapter 11 against the coupling element 10. According to the invention the flanks 29 constitute a number of, in the disclosed embodiment four surfaces separated from each other along the longitudinal axis LA of the adapter 11 that together constitute the active contact surface of the coupling element 10 or of the clamping means, i e the nuts 24, 25, when clamping the adapter 11. In a corresponding way the flanks 30 constitute four surfaces spaced apart in the longitudinal direction of the adapter, said surfaces constitute together the active contact surface of the plug 18 for co-operation with the contact surface 29.

The nuts 24, 25 are non-rotationally guided relative to the coupling element 10 by a guide pin 31 arranged in the coupling element 10. The guide pin 31 projects into a groove 32 in the nuts 24, 25, said groove running in the transverse direction of the adapter 11, i.e., along a center axis CA, whereby the nuts 24, 25 can be displaced in said transverse direction.

Figure 3:
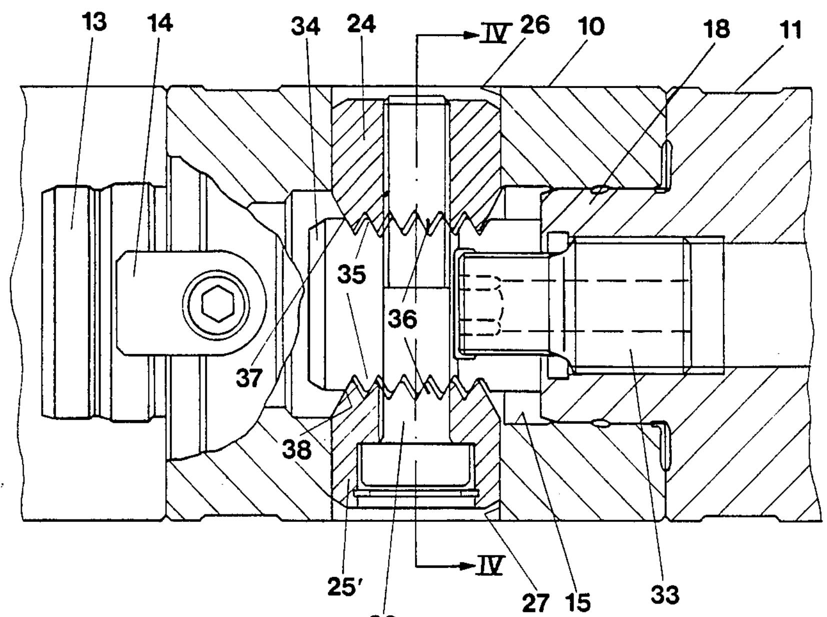
Figure 4:
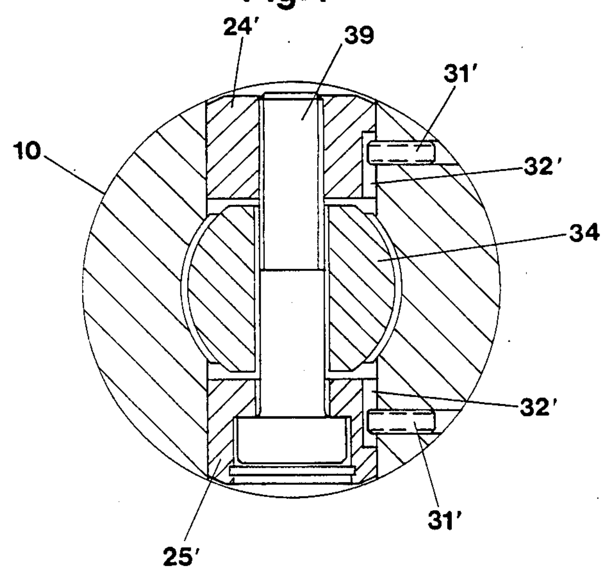

The embodiment of FIGS. 3 and 4 corresponds in all essential parts to the embodiment of FIGS. 1 and 2. In the plug 18 a bolt 33 threaded at both ends is screwed. A nut 34 planed at two opposite sides is screwed ont he bolt 33. The planar sides as well as the interacting sides of the nuts 24', 25' are generally saw-toothed in order to provide teeth 35, 36. The interacting flanks 37, 38 of the teeth 35, 36 constitute six surfaces being separated in the longitudinal direction of the adapter 11, said surfaces constituting together the contact surfaces related to the coupling element 10 and the plug 18 when clamping the adapter 11 towards the coupling element 10. Due to the provision of contact surfaces 38 on the nut 34 they are indirectly arranged on the bolt 33.

The clamping bolt 39 is in respect of force tansmission connected to the nuts 24', 25', i e screwed into the nut or clamping means 24' and arranged to slide freely through the nut or clamping means 25', the head of the clamping bolt 39 bearing against the nut 25'.

Due to the fact that the contact surfaces of the clamping means disclosed in the embodiments of FIGS. 1–4 comprise surfaces 29; 37 spaced along the longitudinal axis, the tendency of the clamping means to upset when clamping the adapter 11 has descresed essentially.

We claim:

1. A tool assembly comprising a coupling element which can be attached directly or indirectly to a tool machine; and a tool adapter for carrying a cutting tool; said coupling element including a forwardly opening bore having at least one internal guide surface; said adapter including a rearwardly projecting tongue configured to be received in said bore, said tongue carrying two sets of first planar contact surfaces extending obliquely relative to a longitudinal axis of said adapter and facing forwardly, said sets being situated on opposite sides of said longitudinal axis, said first planar contact surfaces of each said set spaced apart along said longitudinal axis; a pair of circular clamping nuts carried by said coupling element on opposite sides of said longitudinal axis, each of said nuts defining a center axis extending transversely relative to said longitudinal axis, said center axes being aligned with oen another, said nuts mounted in cylindrical bores in said clamping element for sliding movement toward and away from one another along said center axes, each nut including an end surface facing a respective one of said sets of first contact surfaces; guide means for permitting said nuts to slide along said center axes while preventing said nuts from rotating about said center axes; each of said end surfaces carrying a plurality of second planar contact surfaces oriented obliquely relative to said longitudinal axis and facing toward said tool machine, eahc of said end surfaces carrying at least two said second contact surfaces disposed on opposite sides of said center axis, said second contact surfaces arranged to engage respective ones of said first contact surfaces when said nuts are displaced toward one another along said center axes; clamping screw means extending through said tongue coaxially along said center axes and being connected to said nuts such that rotation of said screw means produces a displacement of said nuts toward each other to bring said second contact surfaces into engagement with said first contact surfaces and establish planar surface areas of contact therebetween which urge said adapter toward said tool machine.

2. An assembly according to claim 1, wherein there are a plurality of said first and second contact surfaces disposed to one side of said center axis, and a plurality of said first and second contact surfaces disposed to the opposite side of said center axis.

3. An assembly according to claim 1, wherein said guide means comprises pins mounted in said coupling element and engaging slots in respective said nuts.

4. An assembly according to claim 1, wherein said clamping screw carries first and second oppositely oriented threads and connected to respective ones of said nuts.

5. An assembly according to claim 1, wherein said clamping screw is threadedly connected to one of said nuts and includes a head abutting the other said nut.

* * * * *